F. WEGNER.
CAN BODY MAKING MACHINE.
APPLICATION FILED JULY 22, 1907.
923,740.
Patented June 1, 1909.
5 SHEETS—SHEET 1.
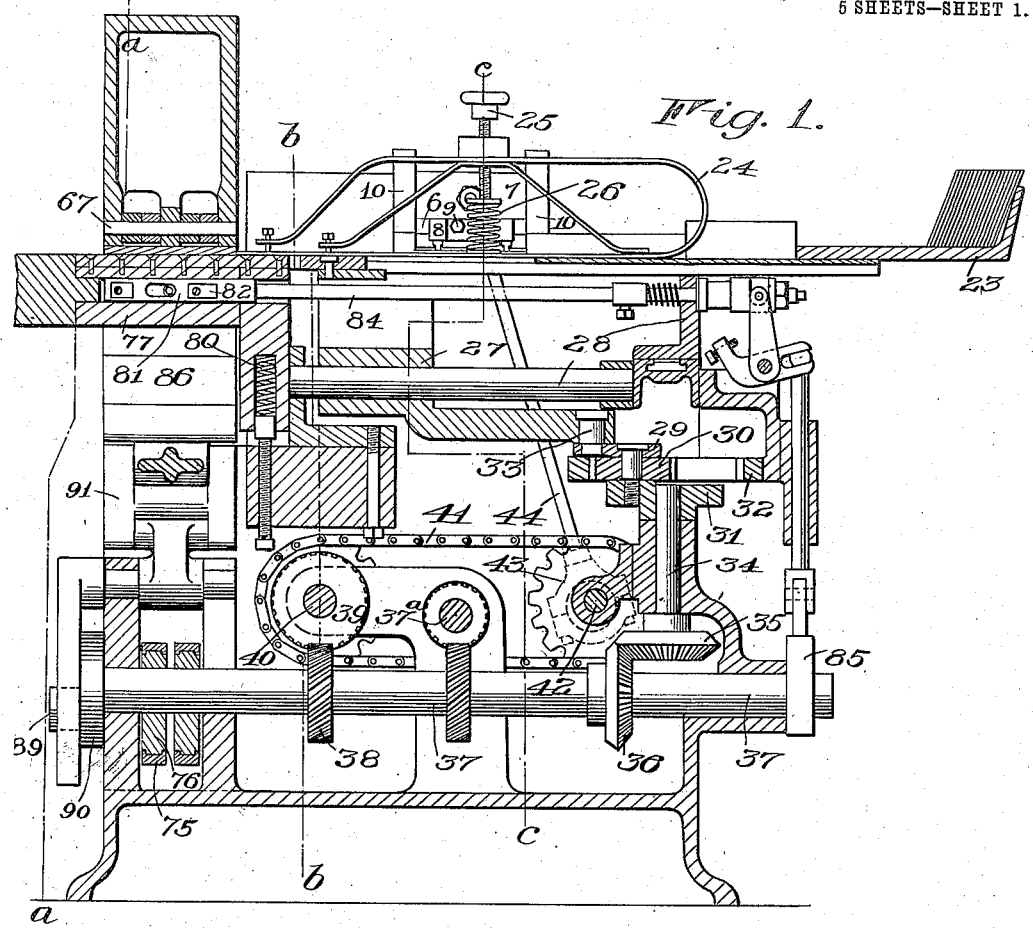
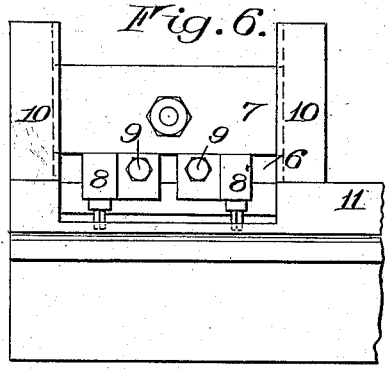
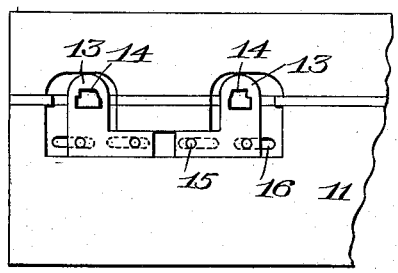
Witnesses
Walter B. Payne
H. H. Simms
Inventor
Fred Wegner
By Church & Rich
his Attorneys

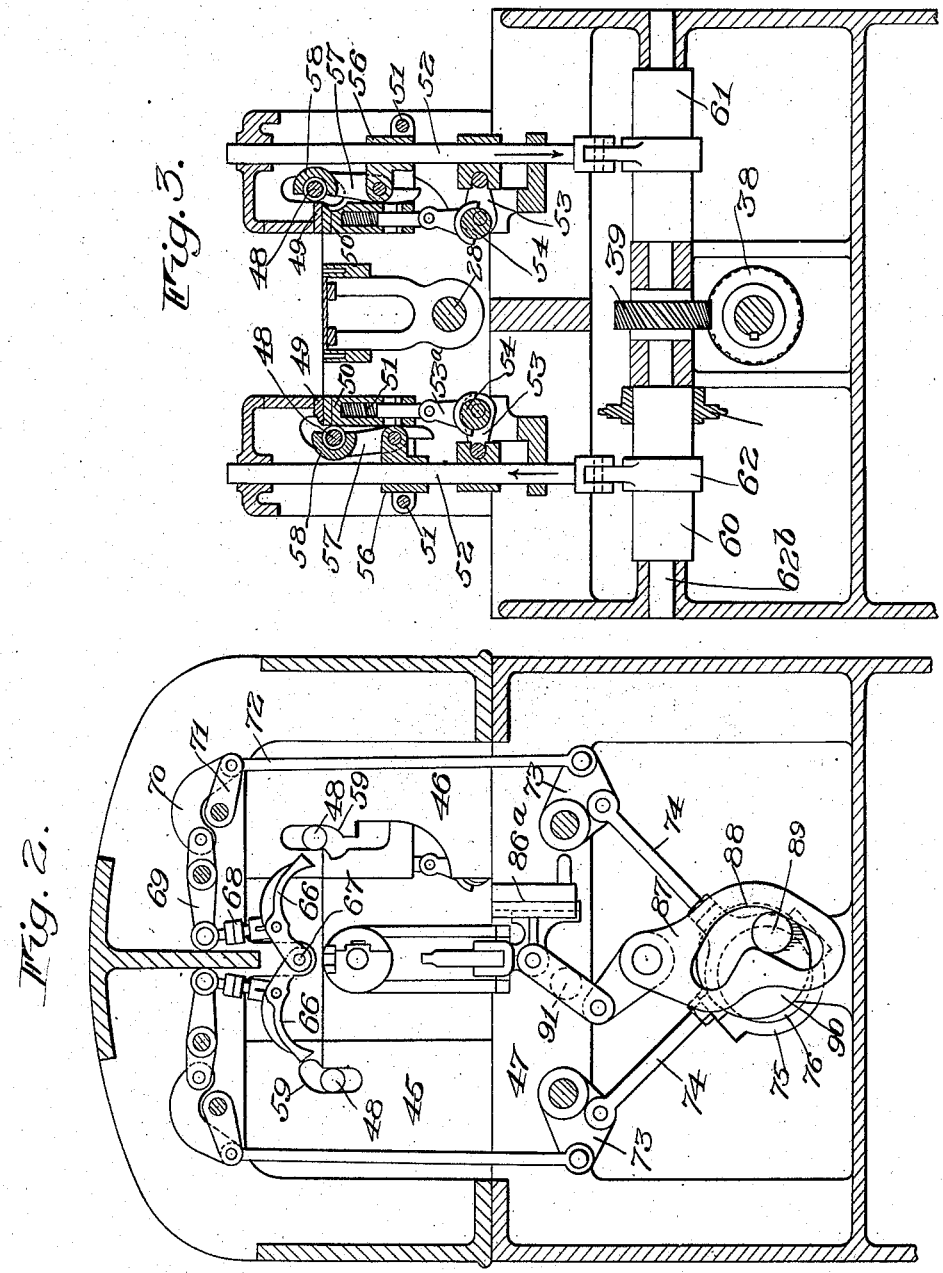

F. WEGNER.
CAN BODY MAKING MACHINE.
APPLICATION FILED JULY 22, 1907.
923,740.
Patented June 1, 1909.
5 SHEETS—SHEET 3.
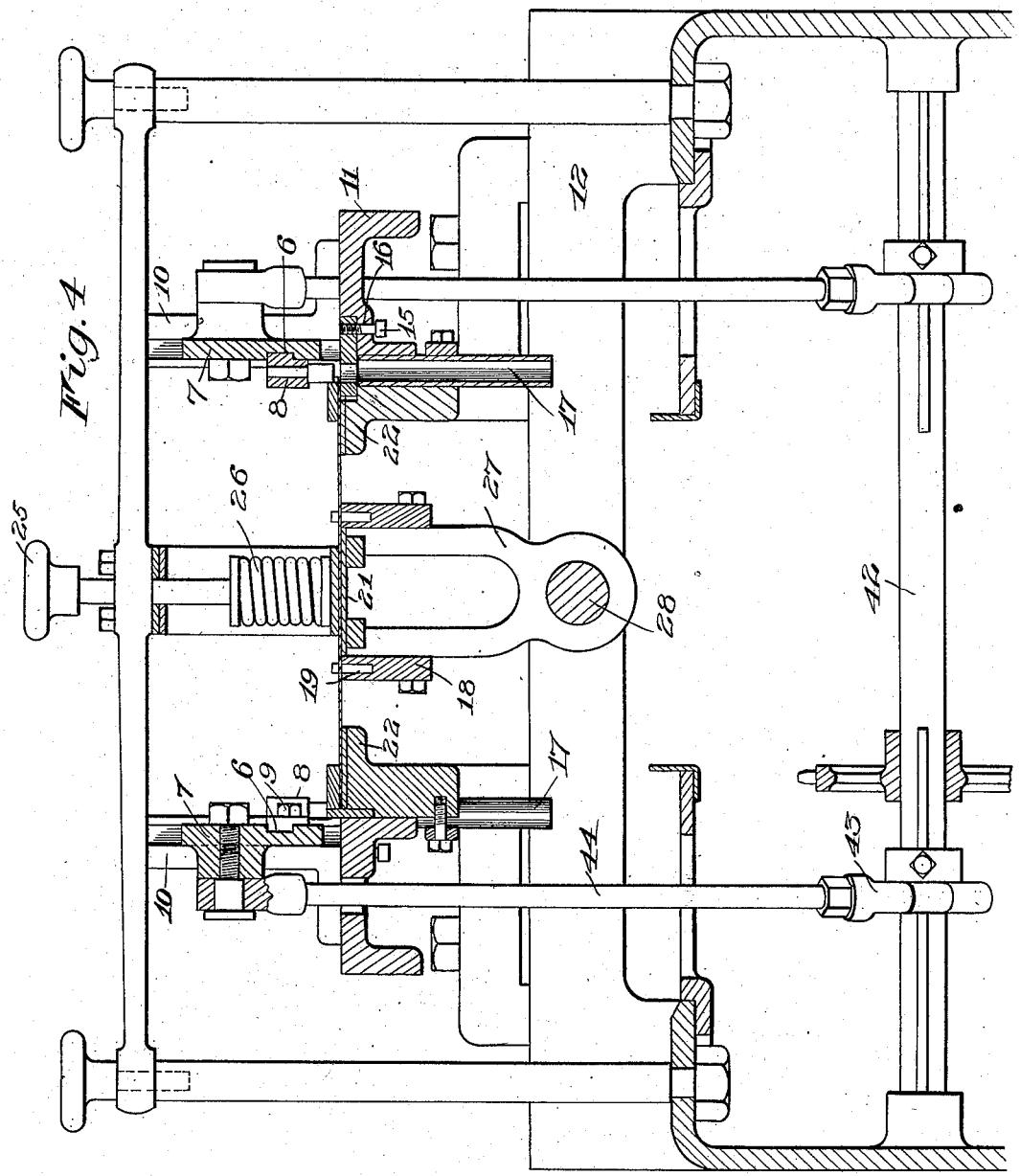
Witnesses
Walter B. Payne
H. H. Simms
Inventor
Fred Wegner
By Church & Rich
his Attorneys F. WEGNER.
CAN BODY MAKING MACHINE.
APPLICATION FILED JULY 22, 1907.
923,740.
Patented June 1, 1909.
5 SHEETS—SHEET 4.
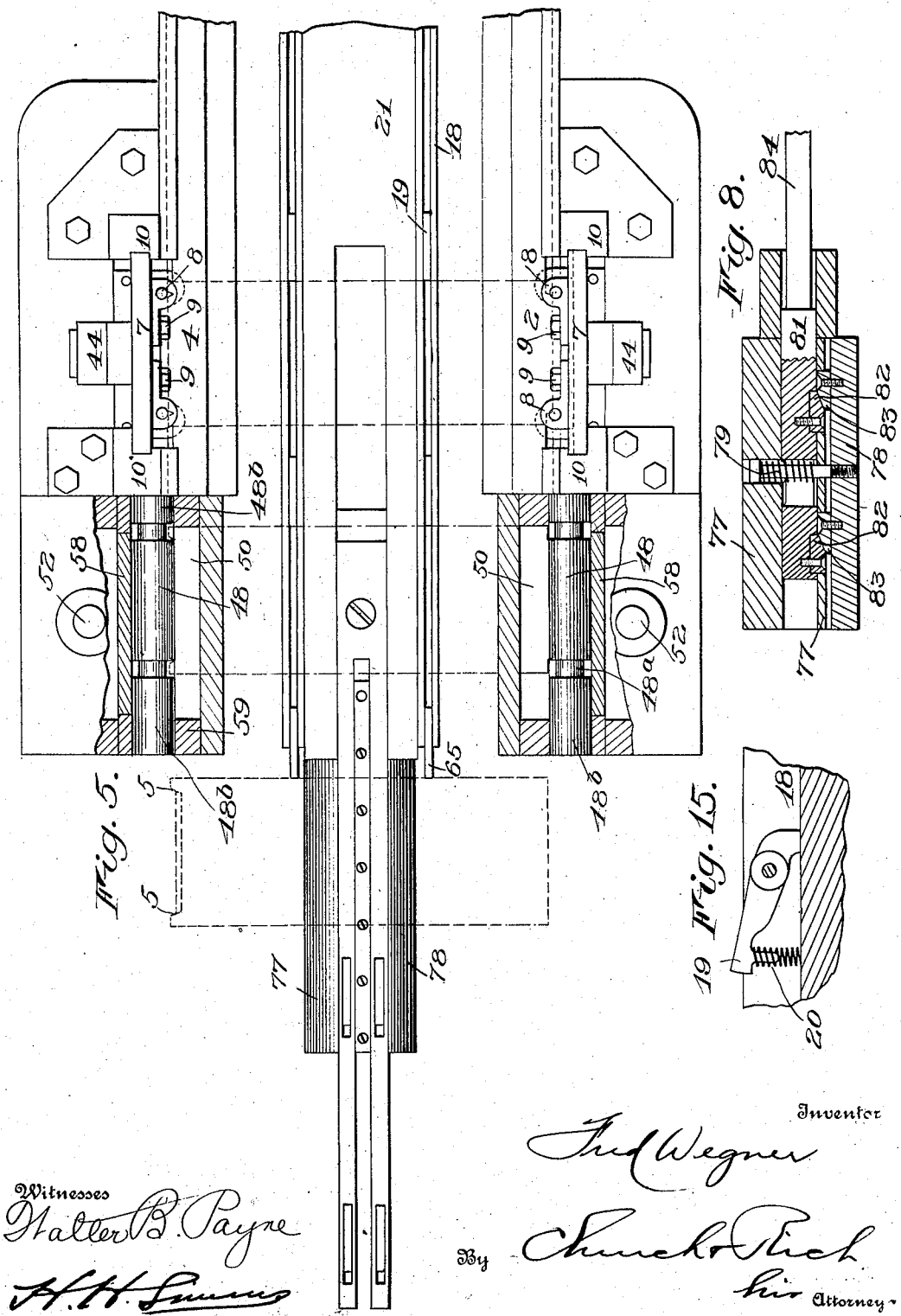

F. WEGNER.
CAN BODY MAKING MACHINE.
APPLICATION FILED JULY 22, 1907.

923,740.

Patented June 1, 1909.
5 SHEETS—SHEET 5.

UNITED STATES PATENT OFFICE.

FRED WEGNER, OF FAIRPORT, NEW YORK.

CAN-BODY-MAKING MACHINE.

No. 923,740.　　Specification of Letters Patent.　　Patented June 1, 1909.

Application filed July 22, 1907. Serial No. 384,948.

*To all whom it may concern:*

Be it known that I, FRED WEGNER, of Fairport, in the county of Monroe and State of New York, have invented certain new and useful Improvements in Can-Body-Making Machines; and I do hereby declare the following to be a full, clear, and exact description of the same, reference being had to the accompanying drawings, forming a part of the specification, and to the reference-numerals marked thereon.

The present invention, which relates to a can body-making machine, has for an object to provide mechanism which will notch the meeting edges of a can body blank near each end so that the portions of the edges between the notches may be bent to form a lock seam and the outer portions may be overlapped in order that the body may be provided at its ends with flanges to which the tops are seamed.

A further object is to combine with the notching mechanism suitable mechanisms which will bend those portions of the meeting edges between the notches and will otherwise complete the formation of the can body.

To this and other ends the invention consists in certain improvements and combinations of parts all as will be hereinafter more fully described, the novel features being pointed out in the claims at the end of the specification.

Figure 9:
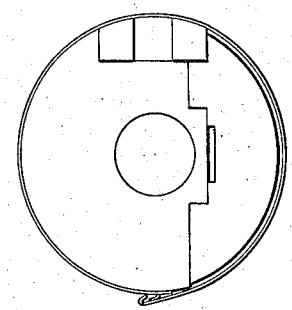
Figure 10:
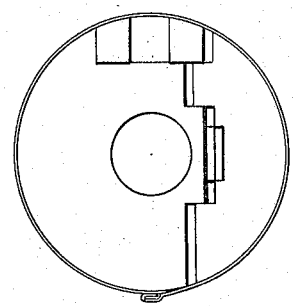
Figure 11:
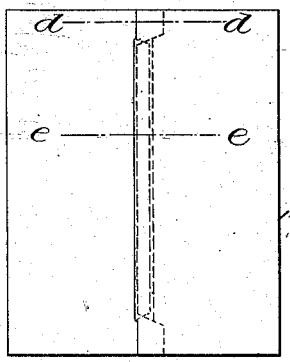
Figure 12:
Figure 13:
Figure 14:
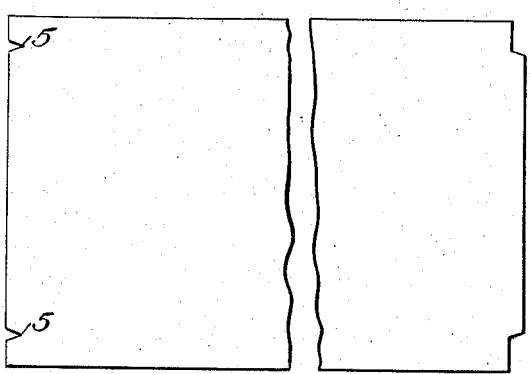

In the drawings:—Figure 1 is a central longitudinal section through a machine embodying my invention. Fig. 2 is a section on line *a—a* of Fig. 1. Fig. 3 is a section on line *b—b* of Fig. 1. Fig. 4 is an enlarged section on line *c—c* of Fig. 1. Fig. 5 is a top view of one end of the machine, parts being removed and parts being in section. Fig. 6 is a detail view of one pair of the cutters or notchers. Fig. 7 is a detail view of one of the pairs of dies. Fig. 8 is a sectional view of the expanding mandrel. Fig. 9 is an end view of the mandrel with a blank thereon before expansion. Fig. 10 is a like view after the expansion of the mandrel and the pressing of the seam. Fig. 11 is a side view of the can body after it passes from the machine. Fig. 12 is a section on line *d—d* of Fig. 11. Fig. 13 is a section on line *e—e* of Fig. 11. Fig. 14 is a plan view of one of the blanks after it has been notched and before the bending takes place. Fig. 15 is a detail view of one of the carrier pawls.

The can notching mechanism forming one of the features of my invention is preferably combined with a suitable seaming mechanism, and in the present instance comprises two spaced pairs of cutters or notching devices, the members of each pair being arranged in spaced relation so as to operate on one meeting edge of a blank 1, one pair 2 being formed to cut away the corners on one edge of the blank, as shown in Fig. 14, and the other pair 4 notching the opposite edge a short distance from the corners as at 5. In order that can blanks to form cans of different height may be notched, the members of each pair of cutters are adjustable toward and from each other and for this purpose I provide a suitable means permitting the adjustment which preferably comprises horizontal guideways 6 on carriers 7, which have the cutter holders 8 adjustable thereon and held in their adjusted positions by bolts 9. The carriers 7 are adapted to be reciprocated on vertical guides 10, one pair arranged at each end of a carrier and supported preferably on one of two frame pieces 11 which may be made movable to and from each other on a horizontal guide 12 in order that the cutters may be adjusted for can blanks of different lengths. Carried preferably by each frame piece is a pair of dies 13 each having an opening 14 conforming to the shape of the coöperating cutter and adjustable toward and from each other as by means of bolts 15 working in slots 16 in the frame pieces; chutes 17 in the form of tubes being arranged on the frame pieces to receive the cuttings from the dies and to conduct them away.

So as to feed the blanks past the notching mechanism I may employ a feeder, in its preferred form comprising two reciprocating bars 18 which carry pivoted dogs 19 pressed upwardly by springs 20, and are arranged on opposite sides of a table 21, overhanging guides 22 being positioned on the outer sides of the bars, preferably on frame pieces 11, to receive the meeting edges of the blanks, and being adjustable toward and from each other for the purpose of receiving blanks of different lengths. Blanks from a hopper 23 are fed by hand into the path of the reciprocating bars, the dogs of which on their rearward movement slide under the blanks and on their forward movement advance the blanks the distance moved by the bars. The parts are so timed that each blank will be carried to the notching mechanism into a position to be cut during one downward movement of the cutters, and in order that the blanks will not become deranged, I may employ a pressure device such, for instance, as that shown which comprises a spring 24 formed of flat metal and bent so that it exerts pressure on all blanks passing by the notching mechanism, that is, between the two pairs of cutters, an adjusting screw 25 being provided to vary the pressure on a coil spring 26 and thereby change the pressure on the spring 24. The bars 18 are operated by a suitable means which preferably comprises a slide 27 connecting the bars and movable on a guide 28 arranged beneath the table, said slide being connected to a crank arm 29 on a pinion 30 eccentrically carried by a disk 31 and meshing with a fixed internal gear 32 so as to produce a right line movement of the pin 33 of the crank arm. The disk 31 is carried on the upper end of a vertical shaft 34 which at its lower end carries a bevel gear 35 meshing with a like gear 36 on a horizontal shaft 37 extending longitudinally of the frame of the machine. Shaft 37 is driven by a transverse shaft 37ª and may also serve as a means for driving the notching mechanism, for this purpose carrying a worm wheel 38 which meshes with a worm wheel 39 on a transverse shaft 40. Shaft 40 is connected by a sprocket chain 41 with shaft 42 having eccentrics 43 mounted thereon and operating on pitmen 44, each connected to one of the carriers 7, the eccentrics being movable longitudinally of the shaft and serving as driving connection, permitting the adjustment of the pitmen toward and from each other for effecting the adjustment of the notching devices. The seaming mechanism comprises in this instance mechanism for bending the meeting edges, mechanism for bending the body, and a device acting on the seam to compress it. The mechanism for bending the meeting edges between the notches in this embodiment comprises two devices 45 and 46, to which the blank is fed by the feeder arranged on opposite sides of the latter to operate on each edge of a blank and in this instance adjustable on guides 47 toward and from each other for the purpose of working on blanks of different lengths. Each device preferably comprises a clamp and a bending roller 48, the latter being formed with annular grooves 48ª to provide a working surface equal in length to the length of a meeting edge between the notches, or in other words, to the distance between the members of a pair of cutters, so that the other portions of the blank will not be engaged. The clamp may consist of an upper fixed jaw 49 and a lower movable jaw 50 swinging about an axis 51, the jaws being so positioned that they clamp a blank away from its meeting edges so that the notched edges project therefrom. The movable jaw 50 and the roller 48 are preferably operated by a plunger 52 connected to the movable jaw by a lever 53 turning an eccentric 54 bearing against a link 53ª which is united to a plunger 55 yieldingly connected to the jaw 50 by a spring 51 in order to permit the bending roller to operate from the plunger 52 after a blank is clamped.

The connection between the plunger and the roller consists of a collar 56 to opposite sides of which are pivoted arms 57 extending downwardly from a concave bearing 58 in which the roller 48 turns. The ends 48ᵇ of the roller work in cams 59 which cause the roller to travel vertically at first to bend a notched end of a blank at right angles and then inwardly to deflect the end so that it forms an acute angle with the blank. The roller 48 of the device 45 moves upwardly to cause the formation of the seam flange, while the roller device 46 moves downwardly to produce this result, the eccentric 54 of device 46 being so disposed that it causes the elevation of its jaw 50 when its plunger 52 moves downwardly. The plungers 52 of the devices are moved in opposite directions by oppositely disposed eccentrics 60 and 61 which are elongated to permit the collars 62 which are connected to the plungers 52 to slide thereon when the devices 45 and 46 are adjusted for longer blanks. These eccentrics are carried by the shaft 40 before mentioned. From this bending mechanism the cans are carried by the feeding mechanism to the body bending mechanism which comprises an expansible mandrel or former and bending jaws coöperating therewith. The mandrel with its operating parts is removable, so that cans of different sizes may be fitted thereon, but as this feature forms no part of my present invention, it will not be described in detail. A spring 80 yieldingly supports the mandrel on the frame in a position to receive the blank which is fed thereto by means of dogs 65 on the feeder after a blank is clamped.

The connection between the plunger and the roller consists of a collar 56 to opposite sides of which are pivoted arms 57 extending downwardly from a concave bearing 58 in which the roller 48 turns. The ends 49ᵇ of the roller work in cams 59 which cause the roller to travel vertically at first to bend a notched end of a blank at right angles and then inwardly to deflect the end so that it forms an acute angle with the blank. The roller 48 of the device 45 moves upwardly to cause the formation of the seam flange, while the roller device 46 moves downwardly to produce this result, the eccentric 54 of device 45 being so disposed that it causes the elevation of its jaw 50 when its plunger 52 moves downwardly. The plungers 52 of the devices are moved in opposite directions by oppositely disposed eccentrics 60 and 61 which are elongated to permit the collars 62 which are connected to the plungers 62ª to slide thereon when the devices 45 and 46 are adjusted for longer blanks. These eccentrics are carried by a shaft 62ᵇ arranged transversely of the machine and carrying a worm wheel 63 meshing with a worm wheel 64 on the shaft 37. From this bending mechanism the cans are carried by the feeding mechanism to the body bending mechanism which comprises an expansible mandrel or former and bending jaws coöperating therewith. The mandrel with its operating parts is removable, so that cans of different sizes may be fitted thereon, but as this feature forms no part of my present invention, it will not be described in detail. A spring 80 yieldingly supports the mandrel on the frame in a position to receive the blank which is fed thereto by means of an extension 65 on the feeder working in a groove in the upper face of the mandrel. The jaws 66 turning about a common axis 67, swing downwardly to bend the blank about the former or mandrel, so that the edges of the blank lie in the position shown in Fig. 9. The means for operating the two jaws 66 is the same for each and comprises an adjustable link 68 pivotally connected to one arm of a double armed lever 69, the other arm having one end of a bent lever 70 pivoted thereto. The other end of the bent lever is connected to one end of a swinging arm 71 which is arranged therebeneath and is operated by a push bar 72 connected at its lower end to a swinging member 73. Swinging member 73 is operated by a pitman 74 connected by a collar 75 with an eccentric 76.

After the blank has been bent to the form shown in Fig. 9, the mandrel or former is expanded in order that the meeting edges will interlock and to permit this action the mandrel is formed of two sections 77 and 78 which are held together by a spring 79 surrounding a headed pin carried by section 78 and abutting section 77. A plunger 81 is movable within the mandrel and carries cam surfaces 82 to engage like surfaces 83 on section 78 to cause the expansion, the plunger 81 being moved by a rod 84 operated by an eccentric 85 on the shaft 37. When the meeting edges of a can have been interlocked by the expansion of the mandrel, a hammer 86 or other pressure device engages the interlocked portions and compresses the seam. This hammer is preferably arranged below the mandrel so as to move on guide 86ª and in this instance is operated by a swinging member 87 having one end provided with a cam groove 88 in which an eccentric pin 89 on disk 90 works, the other end being connected with the hammer by a link 91, disk 90 being arranged on one end of shaft 37 before mentioned.

Generally stated, the operation is as follows: Blanks are fed singly by hand from the hopper 23 to the feeder which intermittently moves them first to the notching devices, where they are notched in the manner shown in Fig. 14, and then to the bending rollers where the portions of the meeting edges between the notches are bent in opposite directions. After this bending the feeder conveys them to the mandrel while the latter is in its reduced form and the jaws 66 bend them in the manner shown in Fig. 9. Upon the expansion of the mandrel the bent portions of the blank interlock and are almost immediately compressed by the pressure device. The mandrel now contracts and the body is removed therefrom by the feeder.

I claim as my invention:

1. A mechanism for notching the meeting edges of can blanks comprising a pair of frame pieces, means permitting the adjustment of the frame pieces toward and from each other, vertical guides carried by the frame pieces, carriers movable on the guides, and a pair of cutters on each carrier.

2. A mechanism for notching the meeting edges of can blanks comprising a pair of frame pieces, means permitting the adjustment of the frame pieces toward and from each other, vertical guides carried by the frame pieces, carriers movable on the guides, a pair of cutters on each carrier and means permitting the adjustment of the cutters on each carrier toward and from each other.

3. A mechanism for notching the meeting edges of can blanks comprising a pair of frame pieces, means permitting the adjustment of the frame pieces toward and from each other, vertical guides carried by the frame pieces, carriers movable on the guides, a pair of cutters on each carrier, a pair of dies carried by each frame piece, and means permitting the adjustment of the cutters toward and from each other.

4. A mechanism for notching the meeting edges of can blanks comprising a pair of frame pieces, means permitting the adjustment of the frame pieces toward and from each other, vertical guides carried by the frame pieces, carriers movable on the guides and a pair of cutters on each carrier, a pitman connected to each carrier, a shaft, and driving connections between the shaft and the pitmen, permitting the adjustment of the pitmen toward and from each other.

5. A mechanism for notching the meeting edges of can blanks comprising frame pieces adjustable toward and from each other, notching devices carried by the frame pieces to remove the corners at one end of a can blank and to notch the edge at the other end of the blank at short distances from the corners, means for feeding blanks past the notching devices, and guides for the edges of the blanks adjustable with the frame pieces.

6. A mechanism for notching the meeting edges of can blanks comprising two spaced pairs of cutters, the members of one pair being arranged in spaced relation to remove the corners at one end of a can blank and the other pair being arranged in spaced relation to notch the edge of the other end of the blank at short distances from the corners, a feeder for moving the blanks past the cutters, and pressure devices to act on the blanks while they are passing between the two pairs of cutters.

7. A mechanism for notching the meeting edges of can blanks comprising notching devices to remove the corners at one end of a can blank and to notch the edge at the other end of the blank at short distances from the corners, a feeding device to engage the blanks to carry them past the notching devices, and pressure devices acting on the blanks passing the notching devices.

8. A mechanism for notching the meeting edges of can blanks comprising notching devices to remove the corners at one end of a can blank and to notch the edge at the other end of the blank at short distances from the corners, a feeding device engaging the blanks to carry them past the notching devices, and guides for the edges of the blanks passing to the notching devices.

9. The combination of devices for notching the meeting edges of can blanks near their ends, with mechanism forming a seam of the meeting edges between the notches in each edge without interfering with those portions of the blanks beyond the notches.

10. The combination of devices for notching the meeting edges of blanks near their ends, with mechanism for forming a seam of the meeting edges between the notches in each edge, comprising rollers adapted to bend those portions of the edges between the notches, body bending mechanism effecting the interlocking of the meeting edges, and a device acting on the interlocked edges to compress the seam.

11. The combination with devices for notching the meeting edges of blanks near their ends, of mechanism forming a seam of the meeting edges between the notches in each edge without interfering with those portions of the blanks beyond the notches, and a feeder arranged to carry the blanks past the notching devices to the seaming mechanism.

12. The combination with a mechanism for notching the meeting edges of can blanks comprising two spaced pairs of cutters, the members of each pair being arranged in spaced relation so as to cut one of the edges of a blank near each end, of mechanism forming a seam of the meeting edges between the notches in each edge without interfering with those portions of the blanks beyond the notches, and a feeder arranged to carry the blanks past the notching devices to the seaming mechanism.

13. The combination with two pairs of cutters, the pairs being arranged to cut the meeting edges of a can blank near their ends, of clamps engaging each blank away from its meeting edges, and rollers bending the projecting edges between the notches formed by the cutters.

14. The combination with two pairs of cutters, the pairs being arranged to cut the meeting edges of a can blank near their ends, of clamps engaging each blank away from its meeting edges, and rollers to bend the projecting edges, each having a working surface equal to the distance between the members of a pair of cutters.

15. The combination of means for notching one meeting edge of a can blank away from its corners, with mechanism for bending that portion of said meeting edge between the notches without bending those portions beyond the notches.

16. The combination with a blank can feeder, of notching devices arranged in pairs on opposite sides of the feeder to cut the meeting edges of the blanks, clamps to which the blanks are fed after being notched, and benders arranged to act only on the meeting edges of the blanks between the notches while the blanks are in the clamp.

FRED WEGNER.

Witnesses:
GEORGE W. COOK,
G. H. KELLOGG.